United States Patent [19]

Allemand et al.

[11] Patent Number: 4,571,313

[45] Date of Patent: Feb. 18, 1986

[54] PROCESS FOR THE PRODUCTION OF PLASTIC OPTICAL FIBERS

[75] Inventors: Louis R. Allemand, Limours; Jean Calvet, Paris; Jean-Claude Cavan, Vincennes; Maurice Goldwasser, Antony; Jean-Claude Thevenin, Velizy-Villacourblay, all of France

[73] Assignee: Commissariat a l'Energie Atomique, Paris, France

[21] Appl. No.: 606,244

[22] Filed: May 2, 1984

[30] Foreign Application Priority Data

May 3, 1983 [FR] France ............................. 83 07348

[51] Int. Cl.⁴ .................... B29D 11/00; G02B 6/02
[52] U.S. Cl. .................................. 264/1.5; 264/1.4; 264/102; 264/164
[58] Field of Search ................... 264/1.4, 1.5, 102, 164

[56] References Cited

U.S. PATENT DOCUMENTS

| | | | |
|---|---|---|---|
| 2,980,957 | 4/1961 | Hickt, Jr. ............................ | 264/1.5 |
| 3,837,824 | 9/1974 | Siegmund ........................... | 264/1.5 |
| 4,039,607 | 8/1977 | Miller ................................. | 264/1.5 |
| 4,069,280 | 1/1978 | Kidder .............................. | 264/1.5 |
| 4,160,800 | 7/1979 | Branen ............................... | 264/164 |
| 4,161,500 | 7/1979 | Schleinitz et al. .................. | 264/1.5 |
| 4,381,269 | 4/1983 | Kaino et al. ....................... | 264/1.5 |

FOREIGN PATENT DOCUMENTS

| | | |
|---|---|---|
| 1175422 | 8/1964 | Fed. Rep. of Germany ...... 264/164 |
| 1497545 | 1/1970 | Fed. Rep. of Germany . |
| 2655382 | 6/1978 | Fed. Rep. of Germany . |

*Primary Examiner*—James Lowe

[57] ABSTRACT

Optical fibres of methyl methacrylate-styrene copolymer are produced by forming a sheath in the form of a solid cylinder having at least one cylindrical recess and at least one cylindrical rod constituting the core of the fibres, the rod having a smaller diameter than the recess, introduction of the cylindrical rod into the recess, placing the gap defined between the rod and the cylinder under a vacuum, raising the temperature in order to soften the cylinder and engage it with the rod under the effect of the vacuum and drawing the thus obtained preform.

8 Claims, 3 Drawing Figures

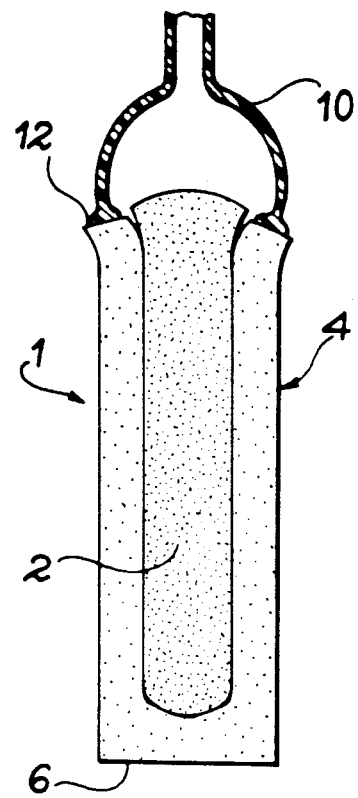
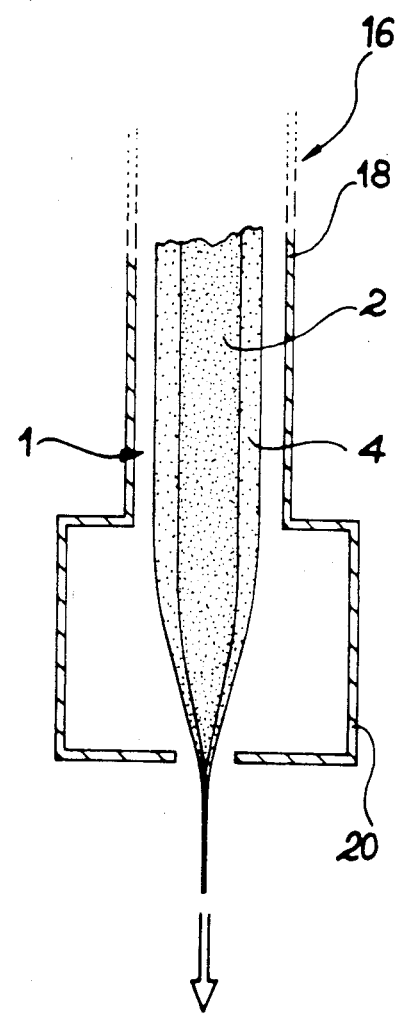
FIG. 2
FIG. 3

PROCESS FOR THE PRODUCTION OF PLASTIC OPTICAL FIBERS

BACKGROUND OF THE INVENTION

The present invention relates to plastic optical fibres and to their production process. These fibres are used for optical transmission purposes, particularly in medicine, telecommunications, the automobile industry, oceanography, display means, for decorative purposes, particle physics, etc.

These optical fibres are generally formed from a first material constituting the fibre core and a second material surrounding the first and constituting the fibre sheath. The core material in which the useful light energy propagates must have good light transmission characteristics and has a refractive index higher than that of the sheath material.

In such optical fibres, light propagates by total reflection in the core—sheath interface. This type of propagation makes it possible to transmit light quantities which increase in proportion with the difference between the refractive indices of the core material and the sheath.

The core material is generally constituted by glass or silica, these materials having good optical transmission characteristics. However, these fibres have the disadvantage of being expensive, heavy and relatively inflexible. Moreover, during the last few years, various attempts have been made to produce optical fibres from plastics material.

The hitherto known plastic optical fibres are constituted by transparent materials of the amorphous type, such as e.g. polymethyl methacrylate, known as PMMA, which is generally used as a core material. Thus, PMMA has a high transparency and a good flexibility. However, it has a relatively low refractive index (1.48–1.50), which makes it necessary to use a sheath material with a lower refractive index. However, low index polymers are extremely rare. The polymers which can be used are fluorinated polymers, such as 2,2,2-trifluoroethyl polymethacrylate, which has a refractive index close to 1.41.

Optical fibres constituted by this material as the sheath material and PMMA as the core material, together with their production process are described in the 1981 Japanese Patent No. 56 8321.

Other fluorinated compounds usable as the sheath material, with PMMA as the core material are described in French Patent No. 2,493,997.

Unfortunately, the production process of these fibres by coextrusion using a double die suffers from shortcomings, such as wear to the die and the attachment of impurities, which leads to a deterioration of the total reflection surface and the risk of a mediocre fibre quality in industrial production.

Another presently used core material is polystyrene, which has the advantage of a high refractive index (1.58–1.62). An example of optical fibres using such a sheath material is illustrated in the article in J. Appl. Phys, 52(2) of December 1981, pp.7061–7063, entitled "Low-loss polystyrenecore-optical fibres". In this example, the sheath material used is a vinyl acetate—ethylene copolymer. However, these optical fibres unfortunately have mediocre mechanical properties.

SUMMARY OF THE INVENTION

The present invention relates to plastic optical fibres making it possible to obviate these disadvantages.

According to the invention, in these optical fibres which comprise a core and a sheath, the latter is mainly constituted by a styrene-methyl methacrylate copolymer.

These copolymers have a very high light transparency (in the visible spectrum between 400 and 7000 nm). Moreover, they have a refractive index between 1.49 and 1.59, as a function of the styrene/methyl methacrylate proportions.

Preferably, the copolymer contains at least 10 mole % of styrene. For example, it can be obtained by polymerizing the azeotropic mixture of styrene and methyl methacrylate. This copolymer has a refractive index of 1.54.

According to an advantageous embodiment of the invention, the core is mainly constituted by the polymer of a compound of formula:

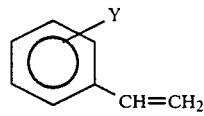

in which Y represents hydrogen or an alkyl radical and in which all or part of the hydrogen atoms of the compound can be replaced by deuterium atoms. Preferably, the compound used is styrene.

These materials have high refractive indices i.e. 1.52–1.62 in the case of polystyrene, which has an excellent transparency.

The use of the methyl methacrylate-styrene copolymer as the sheath material and of polystyrene as the core material makes it possible to obtain monomode optical fibres with numerous applications, bearing in mind the relatively close refractive indices of these materials.

In index jump optical fibres, it is known that the lower the index jump, the wider can be the pass band of these fibres, but the smaller the numerical aperture.

As a function of the envisaged applications, it can therefore be of interest to have an optical fibre adapted to the particular needs, i.e. an optical fibre with a maximum aperture linked with a better adaptation to the input and output components of the fibre, whilst having a pass band adapted to the frequency of the light signal to be transmitted. It is pointed out that the frequency of the signal is essentially limited by the optical path difference between the axial light ray and the light ray in the vicinity of the total reflection.

The optical fibres according to the invention make it possible to bring about this adaptation. Thus, the index jump can vary in magnitude as a function of the materials used and the angular aperture of the transmitted light can vary from ±35° to 0°.

Moreover, styrene-methyl methacrylate copolymers have a good adhesion power with respect to the core materials and particularly when the latter is a polystyrene. This is very important in obtaining a good quality of the core-sheath interface, as well as a good transparency quality of the fibres.

Moreover, the use of these core and sheath polymers makes it possible to obtain plastic optical fibres with excellent mechanical properties. These fibres are particularly strong and manipulatable with far fewer precautions than the prior art fibres.

The invention also relates to the production of the optical fibres made from plastics materials and in particular those described hereinbefore.

According to the invention, this process comprises the drawing of a preform constituted by a core rod in the solid state and consists of the following successive stages:

(a) forming a sheath in the form of a solid cylinder with at least one cylindrical recess, and at least one cylindrical rod constituting the core of the fibres, said rod having a smaller diameter than that of the recess, (b) introduction of the cylindrical rod into the recess and placing under a vacuum the gap defined between the rod and the cylinder, (c) raising the temperature in order to soften the cylinder and to engage it against the rod, under the action of external pressure, and (d) drawing the thus obtained perform.

Stages (b), (c) and (d) can be performed continuously in a single operation and during drawing the two elements of the preform are kept under vacuum.

Moreover, unlike in the prior art processes, the present process makes it possible to prevent any stressing in the sheath of the optical fibres obtained.

This process makes it possible to vary the thickness of the sheath and consequently obtain fibres having very thick sheaths and which have undergone molecular monodrawing, i.e. good mechanical performance levels. It also makes it possible to produce monomode fibres.

In addition, this process makes it possible to obtain fibres, whose core-sheath interface is of better quality than that of fibres produced according to the prior art production processes (of the aforementioned French Patent).

The quality of this interface can be made optimum according to the invention, by polishing the facing faces of the rod and the cylinder which are to be engaged with one another. A heat treatment of the core rod and the sheath can be carried out in order to eliminate mechanical stresses which may have appeared during the polymerization or machining processes.

BRIEF DESCRIPTION OF THE DRAWINGS

FIGS. 1–3 illustrate in sequence the steps of the process.

DESCRIPTION OF THE PREFERRED EMBODIMENTS

Figure 1:
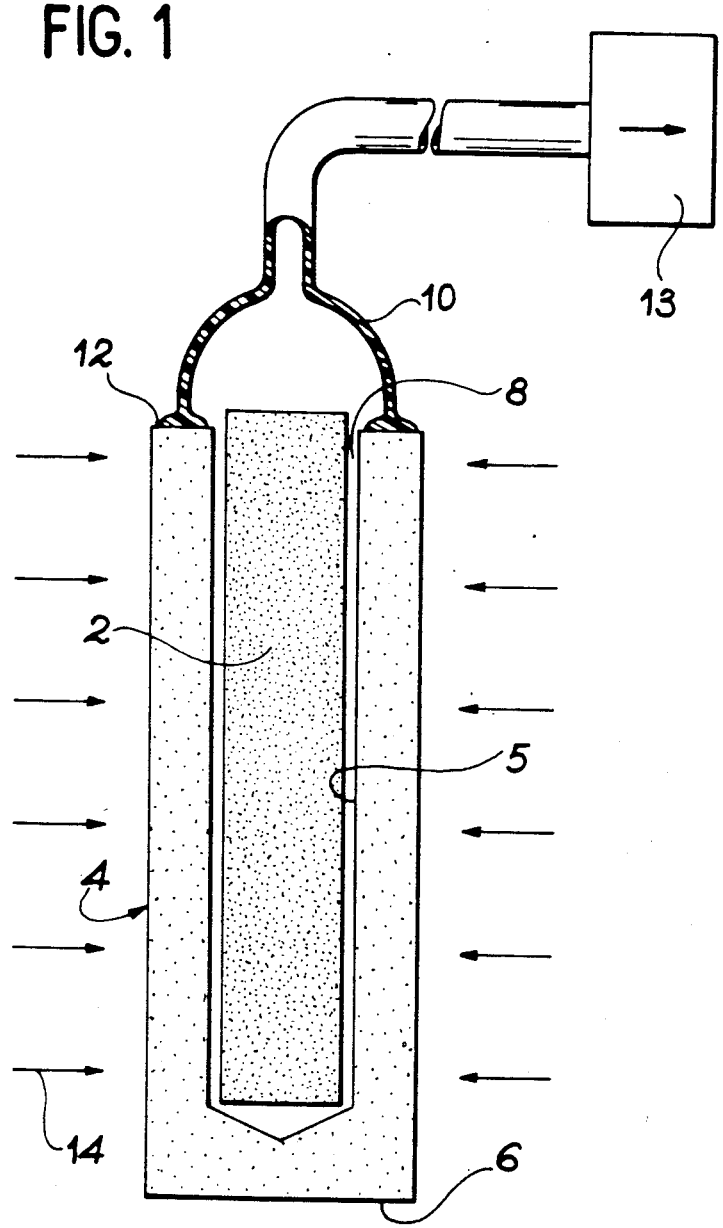

According to the invention, the sheath material of the optical fibres is mainly constituted by a styrene-methyl methacrylate copolymer. The relative quantity of these two monomers is a function of the envisaged application. Advantageously, this copolymer comprises at least 10 mole % styrene. For example, the proportion can be that of the azeotropic mixture of the two monomers under polymerization conditions. Moreover, the core material is preferably constituted by the polymer of a compound of formula:

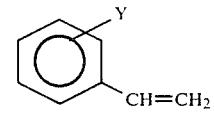

in which Y stands for hydrogen or an alkyl radical, such as e.g. $CH_3$.

In order to reduce the resonances of the C-H bonds, which are the cause of light absorption in the fibres, all or part of the hydrogens of the polymer can be replaced by deuteriums. This can be of particular interest from the commercial standpoint in the case of small diameter optical fibres, i.e. fibres whose core diameter is less than 150 μm.

When Y represents hydrogen, it is possible to e.g. substitute 5 or 8 hydrogens by deuteriums, the compounds corresponding respectively to the formulas:

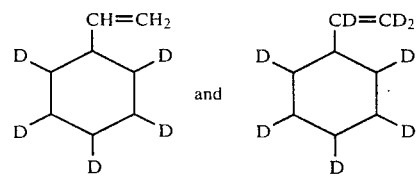

These optical fibres can be monocore or multicore optical fibres. The multicore fibres and constituted by a solid cylinder forming the sheath and with several parallel cylindrical recesses, together with a plurality of cylindrical cores, each rod being located in one of the recesses made in the cylinder. These fibres constitute multichannel fibres.

For example, a description is given hereinafter with reference to FIGS. 1 to 3 of the production of monocore optical fibre, whose core material is polystyrene (Y=H). Obviously, this production process can be applied to any other core material, particularly polyvinyl toluenes (Y=$CH_3$) and to core materials constituted by dueterium polymers. Moreover, this process can be applied to multicore optical fibres.

The first stages of the process consist of producing a preform 1 (FIG. 2) formed from a polystyrene core 2 and a methyl methacrylate-styrene copolymer sheath 4. The two components of an optical fibre, namely the core and the sheath, are produced separately from polymerized material. This separate production more particularly makes it possible to easily vary the sheath thickness.

The core of a fibre according to the invention is obtained from a cylindrical polystyrene rod 2. The latter is obtained by polymerizing pure styrene in a glass ampoule or envelope, which is vacuum-sealed after degassing. The styrene also can be purified by a low pressure, low temperature (approx. 40° C.) distillation, in the presence of a neutral gas (nitrogen or argon) and by eliminating the products obtained at the start and finish of distillation. Mass polymerization is continued by heating, particularly by placing the envelope in an oven according to an adequate heat cycle extending over 4 days and ranging e.g. between 90° and 170° C., for 24 hours at 90° C. and then 24 hours at 170° C. After return to ambient temperature, the envelope is broken.

Annealing after mould removal at approximately 80° C. can be performed in order to eliminate mechanical stresses which have appeared during polymerization.

Annealing can be followed by polishing of the surface of the rod, either mechanically or chemically, or a glazing of the surface of the rod 2, i.e. the passage of said rod through an infrared furnace at a temperature of approximately 160° C., in order to produce certain fusion or melting. This makes it possible to obtain a polystyrene rod with a virtually perfect surface.

In the same way, the sheath of a fibre according to the invention is obtained from a solid cylinder or tube 4 made from styrene-methyl methacrylate copolymer and having a recess 5. This tube 4, which is e.g. closed at one end 6 is obtained in the following way. Styrene and methyl methacrylate in the pure state (purification as described hereinbefore) are copolymerized e.g. in a tube which has been vacuum-sealed after degassing, which leads to a cylindrical rod, which is pierced by machining. The relative quantity of styrene and methyl methacrylate is dependent on the subsequent use of the optical fibre obtained.

In order to aid copolymerization, it is optionally possible to incorporate into the initial mixture polymerization agents such as benzoyl peroxide, azo bis, bis butyronitrile or plasticizers such as e.g. dibutylphthalate, dioctylphthalate or butylmercaptan. These adjuvants are in particular necessary when the methyl methacrylate concentration is high, i.e. higher than 70%.

Mass polymerization is continued by placing the tube in an oven according to an adequate heat cycle extending over 4 days and ranging from 90° to 140° C., e.g. 24 hours at 90° C. and 24 hours at 140° C. Following return to ambient temperature, the tube is broken.

As hereinbefore, annealing can be carried out after mould removal at approximately 90° C. Annealing can be followed by polishing, either mechanically, or chemically from the interior of the sheath material tube 4 in order to obtain an almost perfect internal surface.

Having produced the blanks for core 2 and sheath 4, the core rod 2 is introduced into the sheath tube 4 or more precisely into recess 5 (FIG. 1). Obviously, this can only be carried out if the diameter of rod 2 is smaller than the internal diameter of tube 4. The gap defined between rod 2 and tube 4 is then placed under a vacuum, e.g. using a vent 10, which bears on end 12 of sheath tube 4 and which is connected to a conventional vacuum pump 13. This system for applying a vacuum to gap 8 makes it possible to obviate the use of a vacuum enclosure for housing the perform.

To this end, recess 5 machined in the methyl methacrylate-styrene copolymer cylinder 4 need not be unstopped (FIGS. 1 and 2), but can also be unstopped and sealed by a plug for placing under vacuum.

After placing under vacuum, the temperature of the system is progressively raised to approximately 100° to 120° C. by means of a furnace. This temperature rise leads to the softening of the sheath and makes it possible to engage (FIG. 2) sheath tube 4 is a perfect manner with the core rod 2 under the effect of the external pressure, e.g. atmospheric pressure and indicated by arrows 14.

The fact of using a perform 1 (FIG. 2) makes it possible during the following operations of the process to protect the core—sheath interface of the optical fibre. This makes it possible to obtain fibres with a good interface quality.

The following stage (FIG. 3) of the process consists of slowly drawing the thus obtained preform whilst heating it in a furnace. For example, the preform obtained drops down to a speed of 2 cm/min in a two-stage furnace 16, having a preheating column 18 constituting the first stage and a heating zone by infrared radiation and nitrogen scavenging constituting the second stage 20. Preheating makes it possible to reach a temperature close to the drawing temperature of approximately 200° C. Infrared radiation permits localized, homogeneous heating down to the centre of the preform. The hot nitrogen makes it possible to control the surface temperature. With this type of furnace, large diameter preforms, i.e. of diameter approximately 56 mm can be drawn.

It should be noted that this drawing stage can be carried out in an almost simultaneous manner, i.e. continuously, with the stage of engaging the sheath tube with the core rod.

In view of the fact that the viscosity of the styrene-methyl methacrylate copolymers is higher at the extrusion spinning temperature, the sheath undergoes molecular monodrawing during the drawing of the fibre, so that it and consequently the fibre have excellent mechanical properties. The molecular structure of the sheath undergoes molecular, unidirectional drawing and this situation is fixed during the cooling. This is not the case with the core, whose initial fluidity and slower cooling make it possible to reestablish a non-drawn structure.

It should be noted that the pure polymethyl methacrylate can only be drawn if plasticizers, such as dibutylphthalate, dioctylphthalate or butylmercaptan are incorporated therein. The use of a styrene-methyl methacrylate copolymer according to the invention makes it possible to obtain optical fibres by drawing and without any adjuvant for methyl methacrylate concentrations below 70 mole %. The thus obtained optical fibre can then be covered with a mechanical protective sheath.

With such a process, it has been possible to obtain monocore regular, cylindrical optical fibres of diameter 0.2 to 1 mm, although these values are not limitative. These fibres have light transmission values comparable to or better than the prior art plastic optical fibres. Moreover, these fibres have excellent mechanical properties, as well as a high pass band.

This process also makes it possible to produce multichannel or multicore fibres. Optical fibres of diameter 300 $\mu$m with three 100 $\mu$m channels or diameter 60 $\mu$m and three 20 $\mu$m channels can be obtained.

What is claimed is:

1. A process for the production of plastic optical fibres, comprising the following successive stages:
   (a) forming a sheath in the form of a solid cylinder with at least one cylindrical recess, and at least one cylindrical rod constituting the core of the fibres, said rod having a smaller diameter than that of the recess,
   (b) introduction of the cylindrical rod into the recess and placing under a vacuum the gap defined between the rod and the cylinder,
   (c) raising the temperature in order to soften the cylinder and to engage it against the rod, while maintaining said vacuum to create a pressure differential resulting from said vacuum, and
   (d) drawing the thus obtained preform.

2. A production process according to claim 1, wherein the gap is placed under a vacuum by means of a vent, which bears on one of the ends of the cylinder and connected to a vacuum pump.

3. A production process according to claim 1, wherein, before stage (b), the facing faces of the rod and the cylinder are polished before being engaged with one another.

4. A production process according to claim 1, wherein the sheath is provided by copolymerization of the styrene and the methyl methacrylate.

5. A production process according to claim 4, wherein copolymerization is carried out in the presence of a polymerization agent or a plasticizer.

6. A production process according to claim 1, wherein the core is produced by the polymerization of a compound for formula

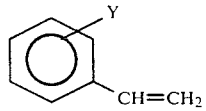

in which Y stands for hydrogen or an alkyl radical, or in which all or part of the hydrogen atoms is replaced by deuterium atoms.

7. A production process according to claim 6, wherein the compound is styrene.

8. A production process according to claim 6, wherein polymerization is followed by a heat treatment.